US009805331B2

(12) United States Patent
Hsu et al.

(10) Patent No.: US 9,805,331 B2
(45) Date of Patent: Oct. 31, 2017

(54) SMARTPHONE-BASED ASSET MANAGEMENT SYSTEM

(75) Inventors: Cheng-Hsin Hsu, Mountain View, CA (US); Kyu-Han Kim, Redwood City, CA (US); Jatinder Pal Singh, Mountain View, CA (US); David M. Chen, Mountain View, CA (US); Sam Tsai, Stanford, CA (US); Bernd Girod, Stanford, CA (US)

(73) Assignees: DEUTSCHE TELEKOM AG, Bonn (DE); THE BOARD OF TRUSTEES OF THE LELAND STANFORD JUNIOR UNIVERSITY, Stanford, CA (US)

(*) Notice: Subject to any disclaimer, the term of this patent is extended or adjusted under 35 U.S.C. 154(b) by 363 days.

(21) Appl. No.: 13/023,679

(22) Filed: Feb. 9, 2011

(65) Prior Publication Data
US 2012/0202515 A1    Aug. 9, 2012

(51) Int. Cl.
| | | |
|---|---|---|
| G06T 15/04 | (2011.01) | |
| G06T 17/00 | (2006.01) | |
| G06Q 10/08 | (2012.01) | |

(52) U.S. Cl.
CPC ................ *G06Q 10/087* (2013.01)

(58) Field of Classification Search
CPC ........ G06T 15/04; G06T 17/00; G06Q 10/087
USPC ............................................ 705/28; 707/758
See application file for complete search history.

(56) References Cited

U.S. PATENT DOCUMENTS

| | | | |
|---|---|---|---|
| 7,212,670 B1* | 5/2007 | Rousselle | G06K 9/0063 |
| | | | 382/173 |
| 7,246,008 B2 | 7/2007 | Daubert | |
| 7,290,707 B2* | 11/2007 | Sawasaki | G06Q 10/0875 |
| | | | 235/385 |
| 7,400,251 B2 | 7/2008 | Czyszczewski | |
| 7,466,232 B2 | 12/2008 | Neuwirth | |
| 7,623,033 B2 | 11/2009 | Ainsworth | |
| 7,623,248 B2 | 11/2009 | Laflamme | |
| 7,693,757 B2* | 4/2010 | Zimmerman | G06Q 10/00 |
| | | | 235/462.11 |
| 7,737,857 B2 | 6/2010 | Ebert | |
| 7,782,208 B2 | 8/2010 | Kennedy | |

(Continued)

OTHER PUBLICATIONS

D. Chen, S. Tsai, K. Kim, C. Hsu, J. Singh, and B. Girod, "Low-cost asset tracking using location-aware camera phones," in Proc. of SPIE Applications of Digital-Image Processing (ADIP'10), San Diego, CA, Aug. 3, 2010, Invited Paper.

(Continued)

*Primary Examiner* — Talia Crawley
(74) *Attorney, Agent, or Firm* — Leydig, Voit & Mayer, Ltd.

(57) ABSTRACT

A method of tracking an inventory of objects via a mobile communications device includes acquiring an image of one or more of the objects via the mobile communications device, which also collects a location of the mobile communications device while acquiring the image of the one or more of the objects. The location and image are transferred from the mobile communications device to a remote server via a wireless network, such that the one or more of the objects are identified at the server based on the image, and the location and identity of the one or more objects are stored on a database associated with the server.

16 Claims, 11 Drawing Sheets

(56) References Cited

U.S. PATENT DOCUMENTS

| | | | | |
|---|---|---|---|---|
| 7,925,084 B1* | 4/2011 | Skirko | | G06T 7/162 382/162 |
| 7,949,568 B2* | 5/2011 | Fano | | G06K 9/00 356/4.03 |
| 8,060,271 B2* | 11/2011 | Dolgov | | G05D 1/0246 701/28 |
| 8,135,726 B1* | 3/2012 | Trandal | | G06Q 10/087 707/758 |
| 8,189,855 B2* | 5/2012 | Opalach | | G06K 9/00 382/100 |
| 8,194,974 B1* | 6/2012 | Skirko | | G06T 7/162 382/162 |
| 8,208,689 B2* | 6/2012 | Savolainen | | G01C 11/025 382/110 |
| 8,233,740 B2* | 7/2012 | Roth | | G06K 9/32 345/629 |
| 8,335,374 B2* | 12/2012 | Boardman | | G06T 7/0012 382/165 |
| 8,630,924 B2* | 1/2014 | Groenevelt | | G06Q 10/087 211/90.01 |
| 2002/0138374 A1* | 9/2002 | Jennings | | G06K 9/00 705/29 |
| 2006/0080035 A1* | 4/2006 | Daubert | | G06T 17/05 701/455 |
| 2007/0037605 A1* | 2/2007 | Logan | | G08B 13/1427 455/567 |
| 2007/0171431 A1* | 7/2007 | Laflamme | | G01C 11/02 356/602 |
| 2008/0077511 A1* | 3/2008 | Zimmerman | | G06Q 10/00 705/28 |
| 2008/0313140 A1* | 12/2008 | Pereira | | G06F 17/30858 |
| 2009/0059270 A1* | 3/2009 | Opalach | | G06Q 10/087 358/1.15 |
| 2009/0060349 A1* | 3/2009 | Linaker | | G06K 9/00664 382/209 |
| 2009/0063306 A1* | 3/2009 | Fano | | G06K 9/00 705/28 |
| 2009/0259571 A1* | 10/2009 | Ebling | | G06Q 50/30 705/28 |
| 2011/0243450 A1* | 10/2011 | Liu | | G06K 9/00577 382/190 |

OTHER PUBLICATIONS

D. Chen, S. Tsai, C. Hsu, K. Kim, J. Singh, and B. Girod, "Building book inventories using smartphones," in Proc. of ACM International Conference on Multimedia (Multimedia'10), Firenze, Italy, Oct. 29, 2010, Short Paper, pp. 651-654.

* cited by examiner

| Scheme | Total Spines | Recognized Spines | Accuracy | Processing Time |
|---|---|---|---|---|
| SURF | 407 | 31 | 7.6 % | 2.72 sec |
| Segmented SURF | 407 | 294 | 72.2 % | 1.76 sec |
| Segmented Upright SURF | 407 | 337 | 82.8 % | 1.65 sec |

FIG. 11

SMARTPHONE-BASED ASSET MANAGEMENT SYSTEM

FIELD

The invention pertains to location-aware asset management, and more particularly pertains to an asset management system integrating visual search tools and location inference techniques.

BACKGROUND

It is important to accurately manage assets to reduce loss and more efficiently deploy the assets when and/or where needed. However, accurately managing a large set of assets is a difficult, time-consuming task, both for individuals and institutions. Asset inventories may be maintained by manual updates or deployments of barcode or radio-frequency identification (RFID) technologies. However, such manual updates will be costly in terms of human labor and the results may sometimes be erroneous.

Barcode or RFID systems, while offering a potential alternative, tend to be expensive and may only be affordable to large institutions. Further, such systems require physically attaching a tag to each asset.

It will be appreciated that the foregoing is not intended to fully or accurately survey the prior art, but rather is simply a recounting of background principles, whether preexisting or not, that may assist the reader in understanding the present disclosure.

SUMMARY

Given the above-described disadvantages, a more efficient and affordable asset management system is desired.

An embodiment of the invention includes a method of tracking an inventory of objects via a mobile communications device. The method includes acquiring an image of one or more of the objects via the mobile communications device and collecting a location of the mobile communications device via the mobile communications device while acquiring the image of the one or more of the objects. The location and image are transferred from the mobile communications device to a remote server via a wireless network, such that the one or more of the objects are identified at the server based on the image, and the location and identity of the one or more objects are stored on a database associated with the server.

In another embodiment, a non-transient computer-readable medium is provided having thereon computer-executable instructions for tracking an inventory of objects via a mobile communications device. The instructions include instructions for acquiring an image of one or more of the objects via the mobile communications device and instructions for collecting a location of the mobile communications device via the mobile communications device while acquiring the image of the one or more of the objects. Instructions are also included for transferring the location and image of the one or more of the objects from the mobile communications device to a remote server via a wireless network, such that the one or more of the objects are identified at the server based on the image, and the location and identity of the one or more objects are stored on a database associated with the server.

According to a further embodiment, a mobile communications device is provided for tracking an inventory of objects. In this embodiment, the mobile communications device includes a wireless communications unit for communicating over a wireless network and an image acquisition unit configured to acquire an image of an object. The device also includes a processor configured to run computer-executable instructions stored on and read from a non-transient computer-readable medium, the instructions being adapted to cause the processor to send, over the wireless network via the wireless communication unit, the acquired image and a location of the object to a remote server so as to provide an inventory of the object based on a computerized recognition of the object.

BRIEF DESCRIPTION OF THE DRAWINGS

Other features of the invention will be appreciated from the attached description and associated figures of which.

DETAILED DESCRIPTION

The principles described herein employ an asset management system consisting of a mobile device with a camera and network connection, and a remotely located server. The mobile device captures images of assets and sends query information to the server. The server performs segmentation and recognition of the objects within the query image, and infers the location of the object using query sensor data. The location and identity of the assets are then saved within an asset database.

An example of books on shelves is used herein as an example to demonstrate the practicality of the described asset management system. In particular, a spine segmentation algorithm is used in addition to the application of robust feature-based image matching to recognize each segmented spine, and to thus accurately estimate each spine's pose in the query photo. Sensor readings from the smartphone and image matching help localize each recognized book spine first within a room and then within a bookshelf.

In an embodiment, the described system employs commodity smartphones and personal computers, and thus is low-cost and easy to deploy. As used herein, the term "smartphone" refers to a mobile electronic computing device usable to place cellular calls and that is equipped with a camera, e.g., an auto-focus camera, motion and orientation sensors, and network access, e.g., high-speed network access. The camera may also be referred to as an image acquisition unit, and may include dedicated code or software for image processing. Each such smartphone includes a wireless communications unit for interfacing to one or more wireless networks. Acquired images may be stored on a memory of the smartphone and/or transferred via the wireless communications unit to a remote entity.

In the described embodiments, the user simply uses the smartphone to acquire one or more images of the assets to be indexed. The pictures are transmitted from the phone to a processing server. On the server, robust image-based features (which are designed to be resilient against geometric and photometric distortions) are extracted from the query photos and matched against a large visual database of previously indexed assets or products. Matching these robust features enables automatic identification of assets in the query photos. Subsequently, metadata such as name, description, price, and manufacturer for each asset can be easily retrieved via the Internet and transferred into the user's inventory database.

Figure 1:
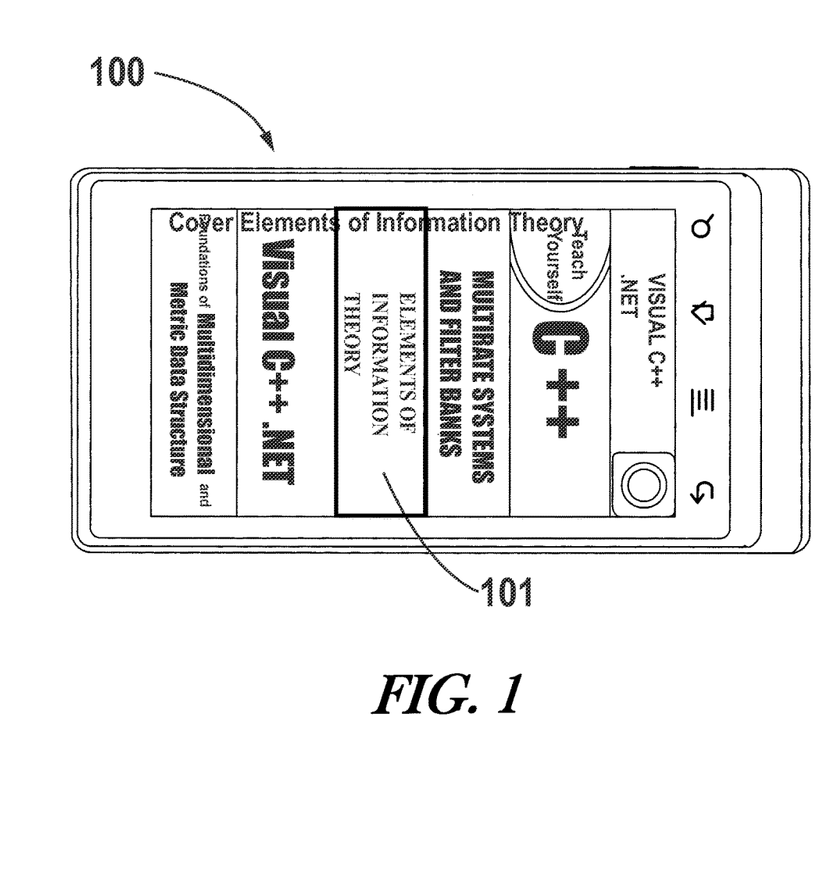
FIG. 1 is a screen shot illustration within a system implementing an asset management method according to an embodiment described herein.

When the smartphone receives a response from the server, the recognized assets can also be highlighted and annotated in the phone's viewfinder. Suppose for example that a librarian is interested in creating an inventory of all the books in the library. FIG. 1 shows the graphical user interface response 100 generated by the system in response to a query snapshot of a bookshelf. Each recognized book spine 101 is highlighted in the smartphone's viewfinder and identified by text on the screen, to provide instant feedback to the librarian about the books being added into the inventory.

In asset management, the location of each recognized asset may be as important as the identity of the asset. In an embodiment of the invention, as the user acquires images, orientation sensors on the smartphone provide valuable information about the surrounding environment. For example, digital compass readings may indicate which direction in a room the user is facing, while accelerometer readings may indicate recent vertical and horizontal movements. These sensor readings are transmitted to the processing server, where a location inference algorithm analyzes the readings to determine the location where each query photo is taken. In an embodiment, initial location estimates based on sensor readings are further refined by matching objects in the query photos against previously photographed objects with known location and pose. The location information is combined with the asset identification and metadata in the user's inventory database.

For image analysis, assets shown in a query photo may only have small areas of visibility, making it difficult to extract a sufficient number of image features for recognition. If there are many assets in a photo, such as multiple book spines on a book rack, then with respect to any single asset of interest, the image features for all other assets in the query photo essentially act as clutter. The inventors have observed that current feature-based image matching methods often fail in high levels of clutter making feature extraction and recognition difficult.

Moreover, in regard to location tracking, the location inference algorithm will often need to cope with large amounts of noise in the smartphone's sensor readings. Ambiguity in the phone's movements is not always resolvable from the sensor readings alone, so assistance is sometimes required from other modalities like the smartphone's camera. These and other issues will be discussed below with respect to certain embodiments of the invention.

Figure 2:
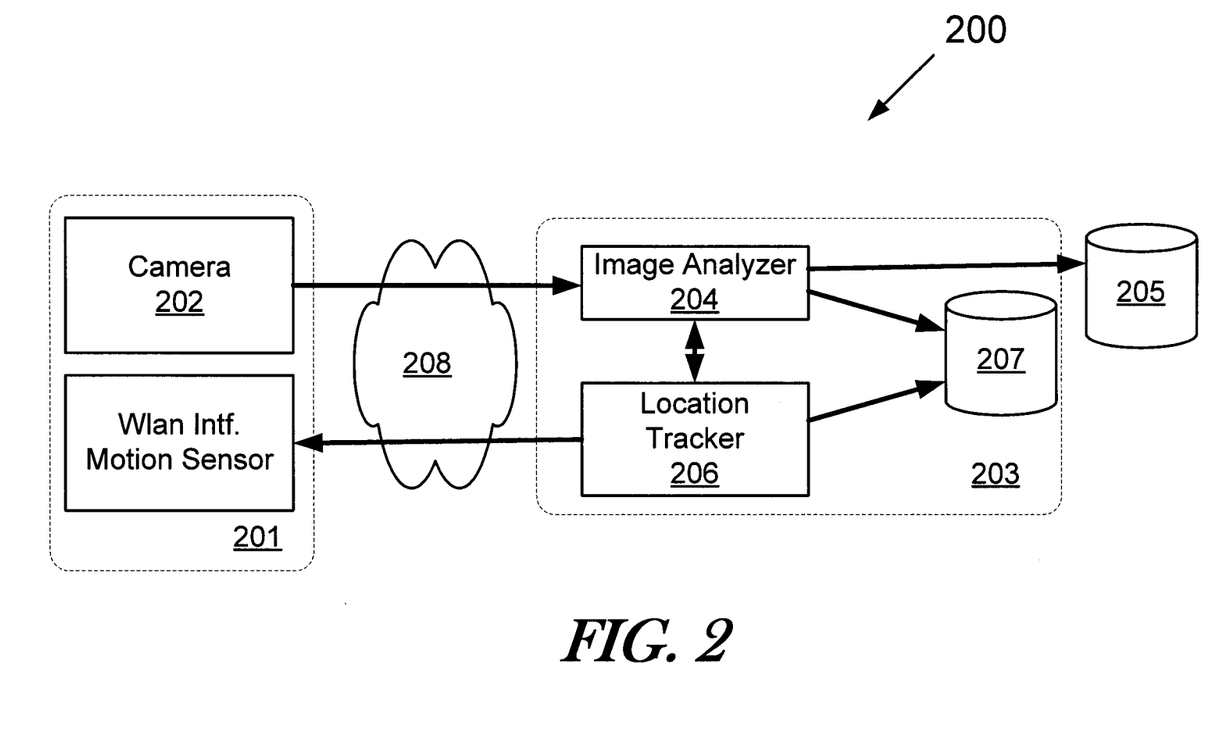
FIG. 2 is a schematic diagram illustrating the building and updating of asset inventory according to an embodiment of the invention.

In an embodiment of the invention, the smartphone hosts and runs a lightweight mobile agent which provides a graphical user interface on the smartphone and communicates with the server over a high speed network such as a wireless local area network (WLAN). The system 200 shown in FIG. 2 illustrates the process and context of building and updating an asset inventory.

When a query photo is sent from the smartphone 201 camera 202 to the server 203 via the network 208, the image analyzer 204 on the server 203 recognizes the individual assets in the query photo through robust feature-based image matching against an online database 205. The query photo may be processed on the smartphone 201 via an application running on the smartphone 201. It will be appreciated that the smartphone 201 is a computing device having a processor and hence the ability to execute computer-readable instructions (a program, code, script, etc.) stored on a non-transient computer-readable medium (e.g., a removable or non-removable non-transient memory medium such as RAM, ROM, flash drive, etc.) The application is the reading of running of these computer-executable instructions by the processor.

The online database 205 may be an integrated or dedicated device, and in an embodiment contains product images from a vendor or publisher. Also on the server 203, the location tracker 206 combines readings from various smartphone sensors to determine the locations of the assets identified in the image. In an embodiment, the location tracker 206 is an application or module that combines GPS, accelerometer, and/or other sensor readings that are available, as discussed in greater detail below, to determine the location of the smartphone and hence of the assets in the image. After the identification and location process, the server 203 may update its inventory database 207.

Figure 3:
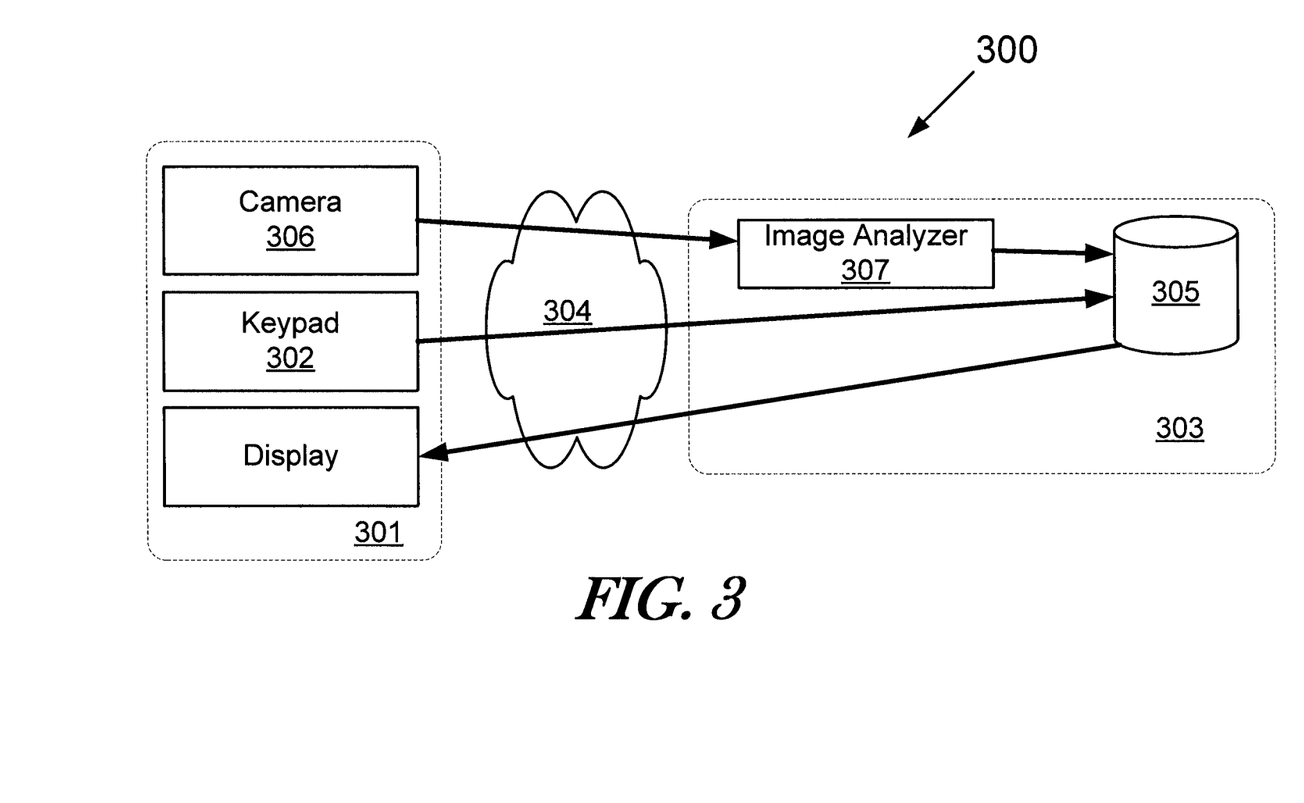
FIG. 3 is a schematic diagram illustrating a process of querying asset inventory according to an embodiment of the invention.

Once an inventory has been constructed as described above, a user may query the asset inventory via the system. FIG. 3 shows the communications and system 300 entailed in performing an inventory query from the smartphone 301. The most common queries are text-based queries. The query text strings typed in at the smartphone keypad 302 are sent to the server 303 via the network 304 and matched against meta data of assets stored in the inventory database 305. For example, a user may type in the book name as the query text to find his/her "Computer Networks" textbook.

The mobile agent on the smartphone 301 also supports image-based queries in an embodiment of the invention, e.g., using the smartphone's camera 306 and the same underlying recognition mechanism employed during inventory construction. In this embodiment, a new query image taken with the smartphone camera 306 is sent to the image analyzer 307 on the server to find a closely matching image in the inventory database 305. This second mode of querying avoids the need for the user to type in text.

As discussed above, the image analyzer is an application or module that identifies the assets in a query image by comparing the query image against images in an online database. Robust asset recognition can be challenging since images may be taken from various viewpoints, at different scales, under diverse illumination conditions, and with varying image quality. Exacerbating this problem, images taken by smartphones typically contain more noise and blurring than images captured with high-quality digital cameras. In an embodiment, local scale-invariant and rotation-invariant image features enable image matching in the presence of many different geometric and photometric distortions.

Although such features are also partially immune to the effects of clutter, they do not work well with images containing many different objects in unknown orientations. From the perspective of any single object, the other objects in the image act as clutter, so the ratio of inlier to outlier features is fairly low for a single object of interest. To address these problems and achieve high recognition accuracy for photos containing many different objects or assets, an embodiment of the invention employs an image analysis algorithm that is carried out in two stages: (i) asset segmentation and (ii) asset recognition.

The process of asset segmentation accurately divides each captured image into several regions, wherein each region is likely to contain a single asset. In a further embodiment, the user provides the specific asset type as an oracle to the system. Leveraging the properties of a given asset type allows the use of a specific segmentation algorithm. Effective segmentation enables the recognition engine to focus on identifying each segmented object, rather than trying to identify the group of objects together.

Following asset segmentation, the process of asset recognition matches the segmented image regions corresponding to different assets against a visual database of individual assets. Even after segmentation, there are strong geometric and photometric differences between each asset's appearance in the query photo and the appearance of the corresponding asset in the database. Thus, local features like the Scale Invariant Feature Transform (SIFT) and Speeded Up Robust Features (SURF) may be used to achieve robust matching in the presence of such visual differences. For scalable searching in a large database, the features may be quantized in a vocabulary tree or another appropriate approximate nearest neighbor (ANN) search structure. The quantized query features can then be quickly compared against quantized database features using an inverted file system associated with the ANN search structure.

Accurate management of the location of each asset poses certain challenges. First, most assets such as books or toys are located indoors. Even though the Global Positioning System (GPS) provides fairly accurate localization in outdoor environments, the same technology exhibits poor localization performance when used in indoor environments. Secondly, in indoor environments, depending on the size of the asset to be tracked, the location information may need to be very fine-grained. For example, to localize a book, it is not sufficient just to know which room contains the book; the position may be needed at the level of a specific bookshelf and which rack within that bookshelf holds the book. Thirdly, physical location information in the form of latitude and longitude coordinates might not be helpful for a user to pinpoint the location of assets. Instead, a semantic description of the location (e.g., living room, north wall, eye level) is used in an embodiment of the invention.

During training, the user specifies which room he/she is standing in while carrying the smartphone, and the location tracker profiles the WiFi fingerprints from multiple nearby WiFi access points. This profile information is then stored in the server for future location look-ups. Subsequently, when the smartphone is building an asset inventory, the location tracker scans local WiFi networks and matches the acquired WiFi fingerprints against the fingerprints stored in the server to quickly and reliably identify the user's current location at a semantic level.

Book spine recognition is more challenging than recognition of the front covers of books and CD/DVD cases. Firstly, a book's spine typically has a smaller surface area than its cover, yielding fewer visual features that can be utilized for robust recognition. Secondly, each query photo of a bookshelf contains many book spines, and with respect to a single spine of interest, all the other spines' visual features represent background clutter. Since books can be randomly placed on the bookshelf, the order in which the books appear is not known beforehand, so the database must contain individual book spine images. Trying to directly match a photo containing many spines against a database of individual spines would result in low recognition accuracy. Segmenting out the individual spines in the query photo is thus important for accurate recognition in an embodiment of the invention.

Figure 4:
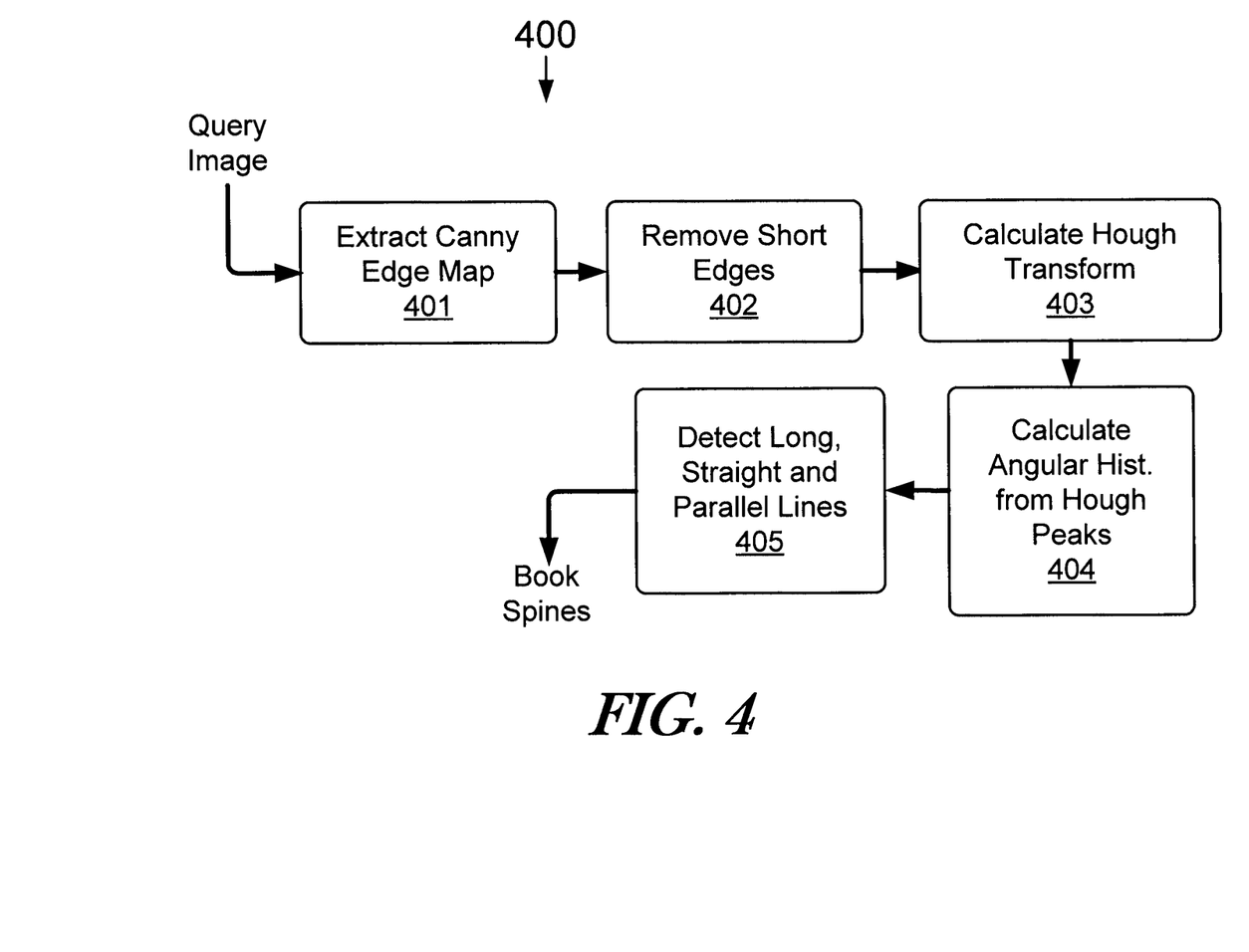
FIG. 4 is a flow diagram illustrating a process of book spine segmentation according to an embodiment of the invention.
Figure 5:
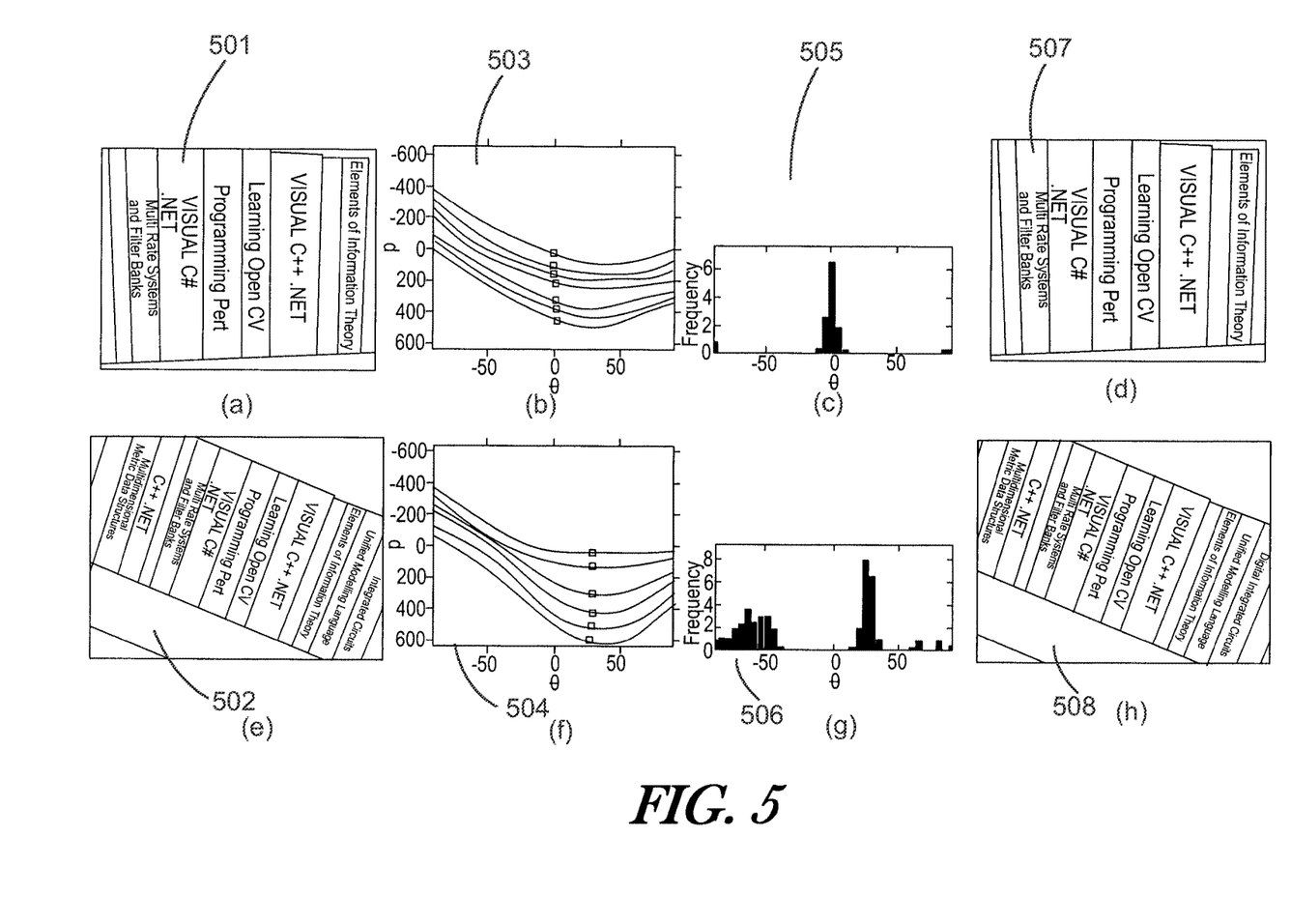
FIG. 5 is a set of plots showing a detailed procedure for segmenting book spine images according to an embodiment of the invention.

To perform the segmentation, the system exploits the fact that books are often densely packed together on a bookshelf and have roughly the same orientation (as exemplified by the query photos shown in FIG. 5, plots 501 and 502). Given this, FIG. 4 is a flow diagram 400 showing the operations performed for segmentation in an embodiment of the invention. First, a Canny edge map is extracted from the query image at stage 401. In the Canny edge map, the crevices between book spines tend to appear as long and straight edges, while the text and graphics on the spines tend to appear as short and/or curved edges. Connected components are detected in the edge map, and all components containing fewer pixels than a lower threshold and having eccentricities far from that of a long straight line are removed at stage 402. Removal of such edges (which typically do not belong to the boundaries between book spines) improves the subsequent steps for line boundary detection.

Next, a Hough transform is calculated from the filtered edge map at stage 403. FIG. 5 (plots 503 and 504) displays the Hough transform calculated for two query images in FIG. 5 plots 501 and 502. In the Hough plots 503 and 504, squares denote the locations in the $(\rho, \theta)$ space where peaks in the Hough transform occur. A large group of peaks around a common angle corresponds to nearly parallel lines between book spines. To estimate the dominant angle θspines of the spines, the Hough peak occurrences are binned in an angular histogram at stage 404 as shown in FIG. 5 plots 505 and 506 The bin attaining the highest count in the angular histogram yields the spines' dominant angle θspines.

Given the dominant angle θspines of the book spines, the process searches for long straight lines with angle near θspines at stage 405. Long straight lines can be detected from the Canny edge map. Each such line having an angle lying in the range $(\theta_{spines}-\Delta\theta, \theta_{spines}+\Delta\theta)$ is considered as a potential boundary between two books. The value $\Delta\theta$ could be for example 15 degrees. FIG. 5, at plots 507 and 508, shows an example of how the segmentation method successfully finds the line boundaries between books. Regions between the line boundaries are segmented out as individual spines. Spine segmentation significantly improves recognition performance compared to a scheme that skips this step, because segmentation substantially boosts the ratio of inlier to outlier features for each single spine.

Figure 6:
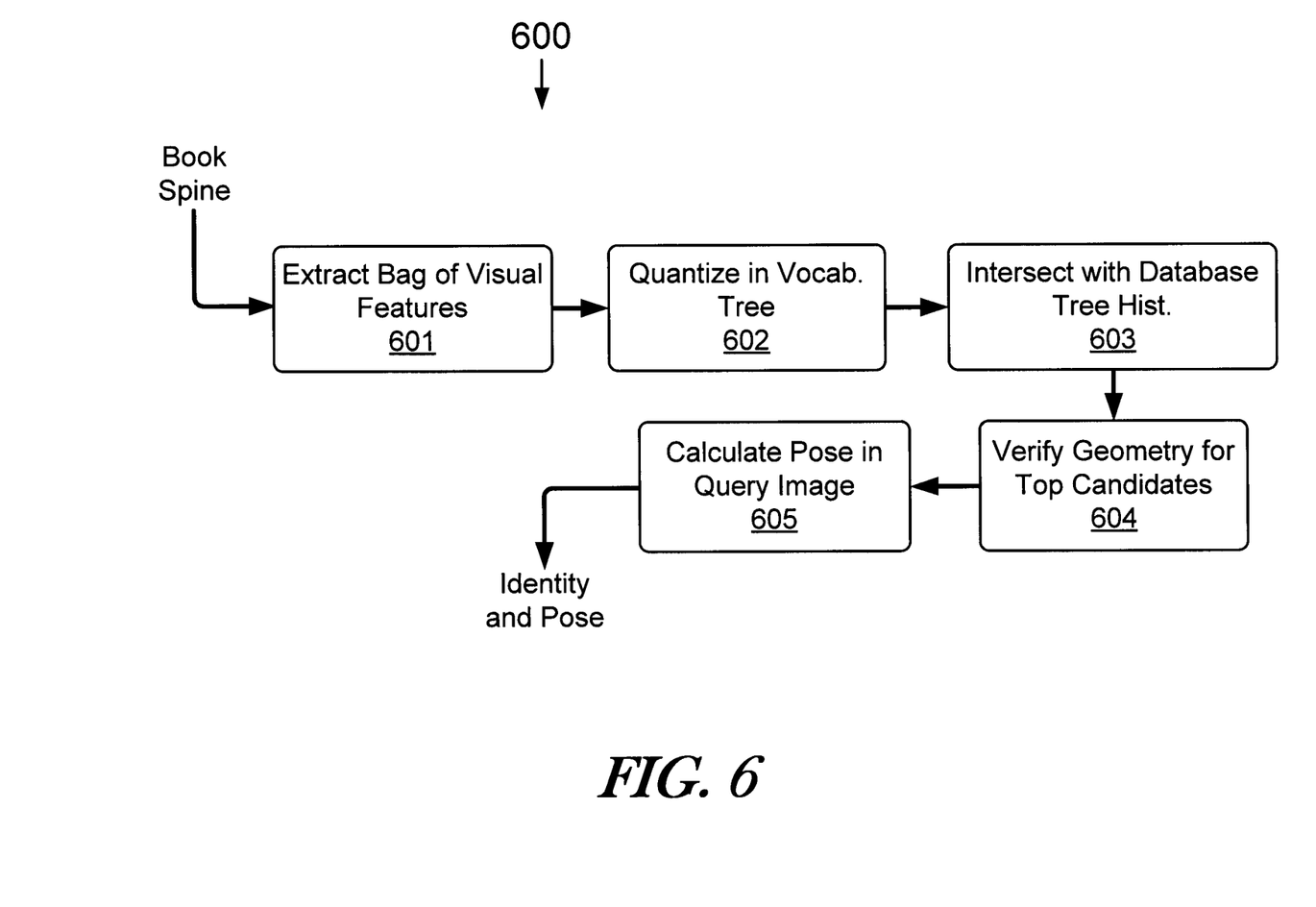
FIG. 6 is a flow diagram illustrating a process of book spine recognition according to an embodiment of the invention.

Next, each of the segmented spines is individually matched against a database of book spines. FIG. 6 shows a flow chart of a recognition process 600. First at stage 601, a set of robust local features, commonly referred to as a bag-of-visual-features (BoVF), is extracted from each query spine. Since achieving low query latency is important for interactive mobile applications, SURF features are employed in an embodiment since they are faster to compute than SIFT features but offer comparable performance. Recognition with BoVF also provides robustness against imperfect segmentation.

Figure 7:
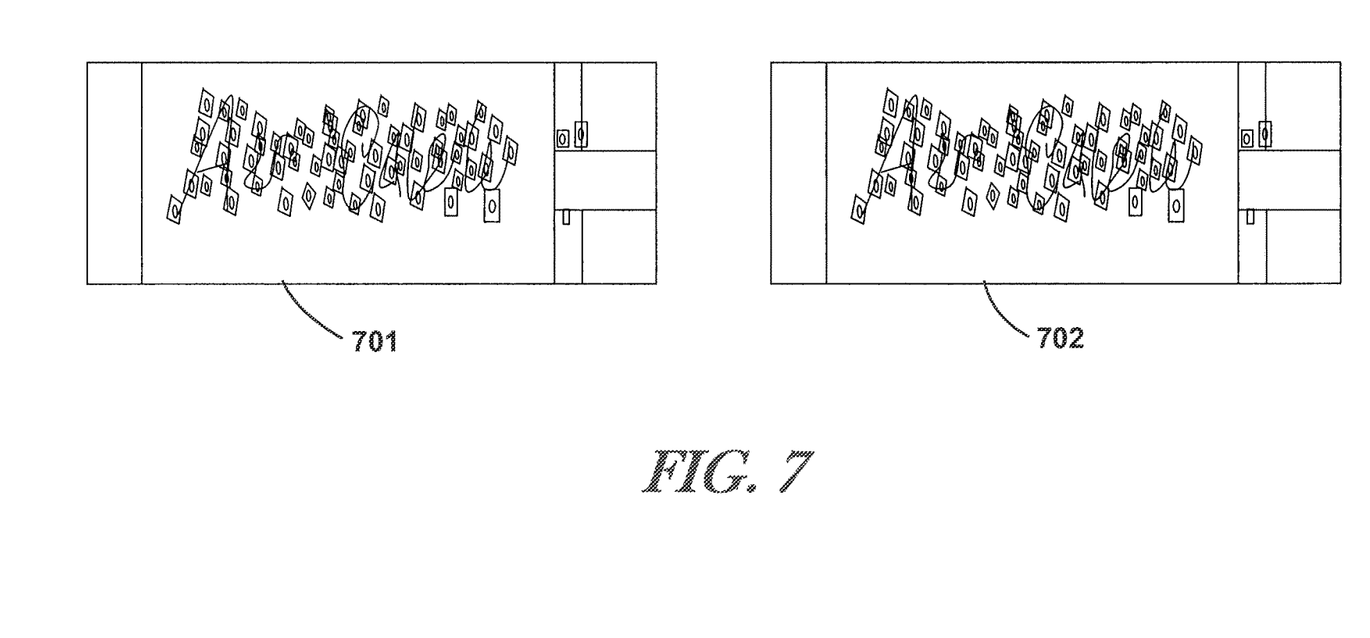
FIG. 7 is a set of simplified images comparing oriented and upright image-based feature keypoints according to an embodiment of the invention.

After segmentation, the system knows the orientation of each book spine. Using this knowledge, the system can extract upright SURF features instead of oriented SURF features. Since orientation assignment is an expensive operation, upright SURF features are faster to compute than oriented SURF features. Furthermore, upright SURF avoids errors in orientation assignment because the orientation of the spine has been predetermined. FIG. 7 shows examples in images 701 and 702 of oriented SURF (701) and upright SURF (702) keypoints for a segmented spine. Notice that the locations and scales of the keypoints are identical in both cases, but in 701, individual orientations are assigned according to the local dominant gradient, while in 702, orientations are assigned to be the same angle. The inventors have observed that upright SURF boosts feature matching performance compared to oriented SURF for segmented book spines.

For fast search through a large database of book spines, each query spine's BoVF is quantized through a vocabulary tree at stage 602. Soft binning is used to mitigate quantization errors. The query spine's quantized BoVF form a tree histogram, counting how often each node in the vocabulary tree has been visited. A similarity score between the query tree histogram and each precomputed database tree histogram is calculated by histogram intersection at stage 603, and in an embodiment of the invention this histogram intersection process is performed very efficiently using an inverted index. Thereafter, a shortlist of the 50 top-ranked database spines are further subjected to rigorous geometric verification with the ratio test and affine model random sample consensus at stage 604 to find spatially consistent feature matches. The best matching database spine is then selected at stage 605 and the pose calculated.

In an embodiment, assets are organized by their locations in the inventory database. Books may be partitioned in the database by the room, the side of the room, and the rack which holds the book. As noted above, WiFi fingerprints, motion and orientation sensor readings, and visual features may be used to identify the location of each book when updating the database.

Figure 8:
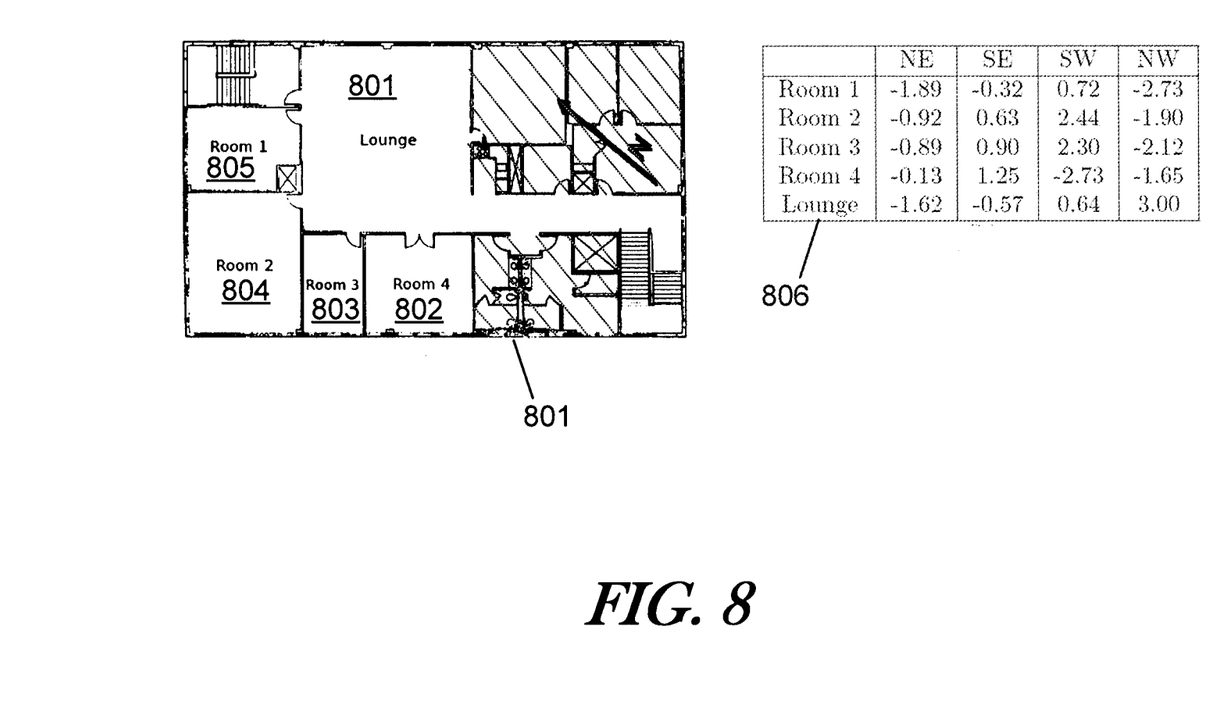
FIG. 8 are a room diagram and location plot resulting from digital compass experiments within an embodiment of the invention.

An experimental environment for verifying the process in a community center example setting is shown in the room diagram 800 of FIG. 8, using the four rooms and the lounge labeled 801-805. When the user starts to take photos of the bookshelves, the client uses the WiFi fingerprint to identify which room the user is in. The orientation of the smartphone is determined from a digital compass fingerprint obtained for each room individually, as shown in the plot 806. Although the compass readings vary between rooms, within a room, the four different directions have sufficiently different signatures for the directions to be discerned from one another.

Figure 9:
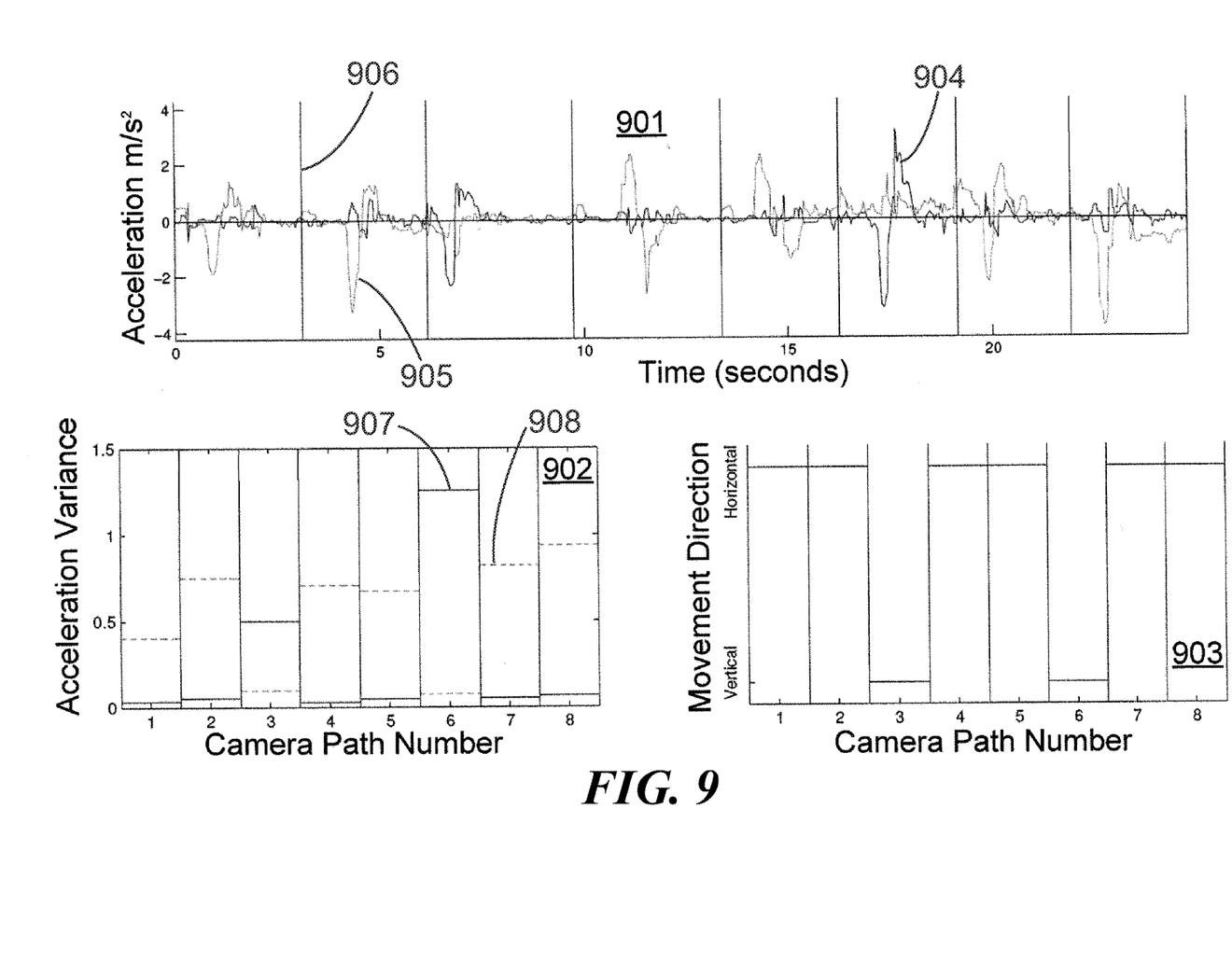
FIG. 9 is a set of data plots illustrating accelerometer measurements from scanning a bookshelf with three racks within an embodiment of the invention.

To further localize each book, the system obtains the physical location of the smartphone in front of the bookshelf. The user scans the bookshelf from top rack to bottom rack. For each rack, the user takes photos from the left to right and then from right to left for next rack, alternatively. The system uses the accelerometer sensor readings during this process in an embodiment of the invention to roughly track the phone's position. Plot 901 of FIG. 9 shows a temporal trace of accelerometer sensor data that was captured scanning a three-rack bookshelf, including vertical 904 and horizontal 905 acceleration for multiple camera shots 906. In the process, the user took three photos for every rack in the bookshelf. As can be seen from the figure, the raw sensor data from the client is fairly noisy. Nevertheless, the system is able to classify the movements to either vertical or horizontal by testing the acceleration variance shown in plot 902 of FIG. 9 with the result shown in plot 903.

When the vertical variance 907 is larger than the horizontal variance 908, the camera path may be classified as a vertical movement, and otherwise as a horizontal movement. Thus, the system may ascertain the rack where the photo a taken by observing the history of vertical movements. These sensor-based position estimates can be further refined using feature-based rack identification as discussed below.

In conjunction with the sensor-based estimates described in the previous section, a photo of a rack, such as those shown in FIG. 5 can be matched against a photo of the entire bookshelf. To facilitate this, robust local features are extracted from the images, and the features in each rack photo are matched against the features in the bookshelf photo using, for example, the geometric verification process mentioned above.

The system has been experimentally implemented. FIG. 1 above shows a screenshot of the viewfinder of a smartphone running the described client software. While any OS may be used, the client software has been developed for both the SYMBIAN OS and the ANDROID OS. Each time the user snaps a query photo, the system searches an online database of book spines, recognizes and localizes each spine in the photo, and adds the recognized spines to the user's inventory database. When the recognition result is sent to the smartphone, the user can conveniently select and view the recognized spines. A selected spine has its boundary highlighted and its title displayed in the smartphone's viewfinder, enabling easy visualization of the new books being added to the inventory database.

Figure 10:
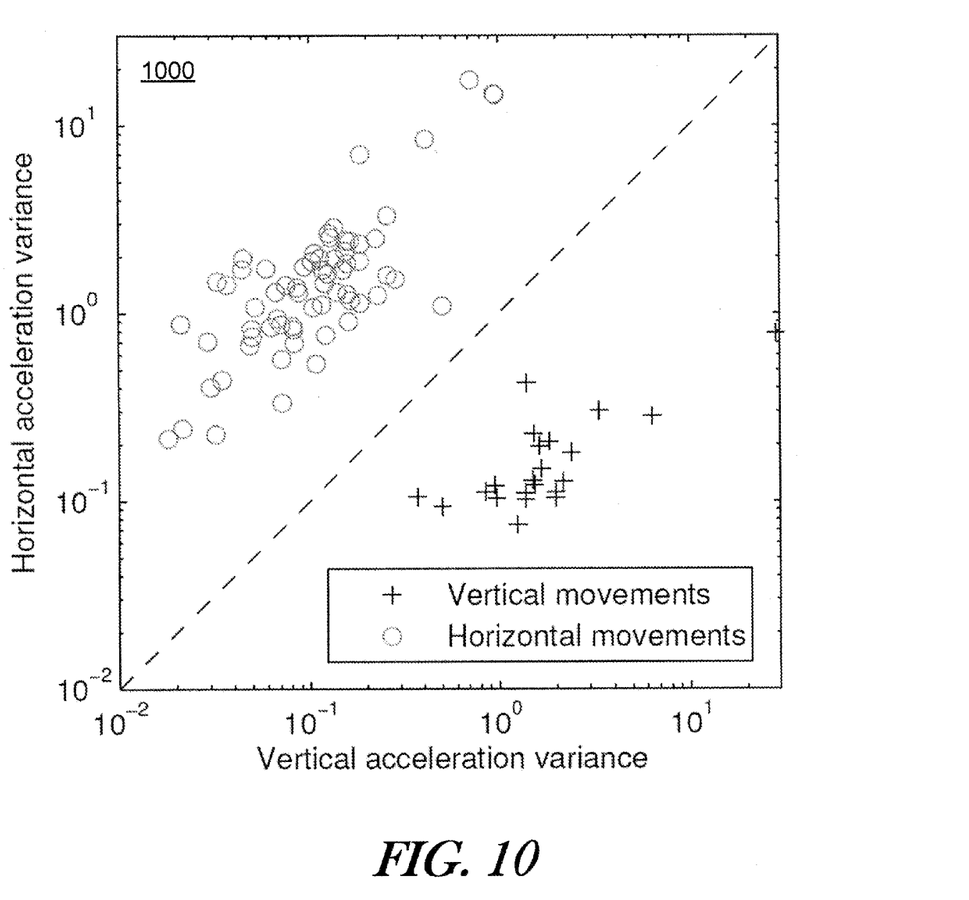
FIG. 10 is a data plot illustrating variance of horizontal and vertical acceleration measured from accelerometer within an embodiment of the invention.

In the mobile client, the location tracking functionality is active as the user constructs the inventory database. To show the performance of the accelerometer-based movement classifier, a scatter plot 1000 of FIG. 10 was created to track the horizontal and vertical acceleration variance. As can be seen in FIG. 10, there is a clear division between the two types of movements. In tests, the inventors did not observe any false classifications. A photo of a bookshelf rack can also be matched against a previously taken photo of the entire bookshelf as noted above. In this case, the inferred location is combined with the book recognition results in the inventory database.

To test recognition accuracy, the inventors constructed a database of 2148 book spine images, simulating a database of books covering a particular subject. The book spine images were taken at the Stanford Engineering Library. SURF features were extracted from each database spine image. The set of all database features was used to train a vocabulary tree with 6 levels and one million leaf nodes. For query images, the inventors took 50 photos of bookshelves with a smartphone, showing books in different orientations and illuminations. Each query image had a resolution of 1024×768 pixels.

The inventors compared three different recognition schemes. First, SURF refers to extracting oriented SURF features from the entire query image, without any spine segmentation, and querying the features against the online database. After vocabulary tree scoring, a shortlist of the 50 top-ranked database spines was verified geometrically. This scheme suffered from the fact that from the perspective of one spine, the features for all the other spines in the query image act as clutter and create a very low ratio of inlier to outlier features. The recognition accuracy, defined as the number of correctly recognized spines divided by the total number of spines in the query images, for the SURF scheme is shown in plot 1100 FIG. 11. As can be seen in field 1101, out of 407 spines in the 50 query images, only 31 were correctly recognized, yielding an accuracy of 7.6 percent.

Figure 11:
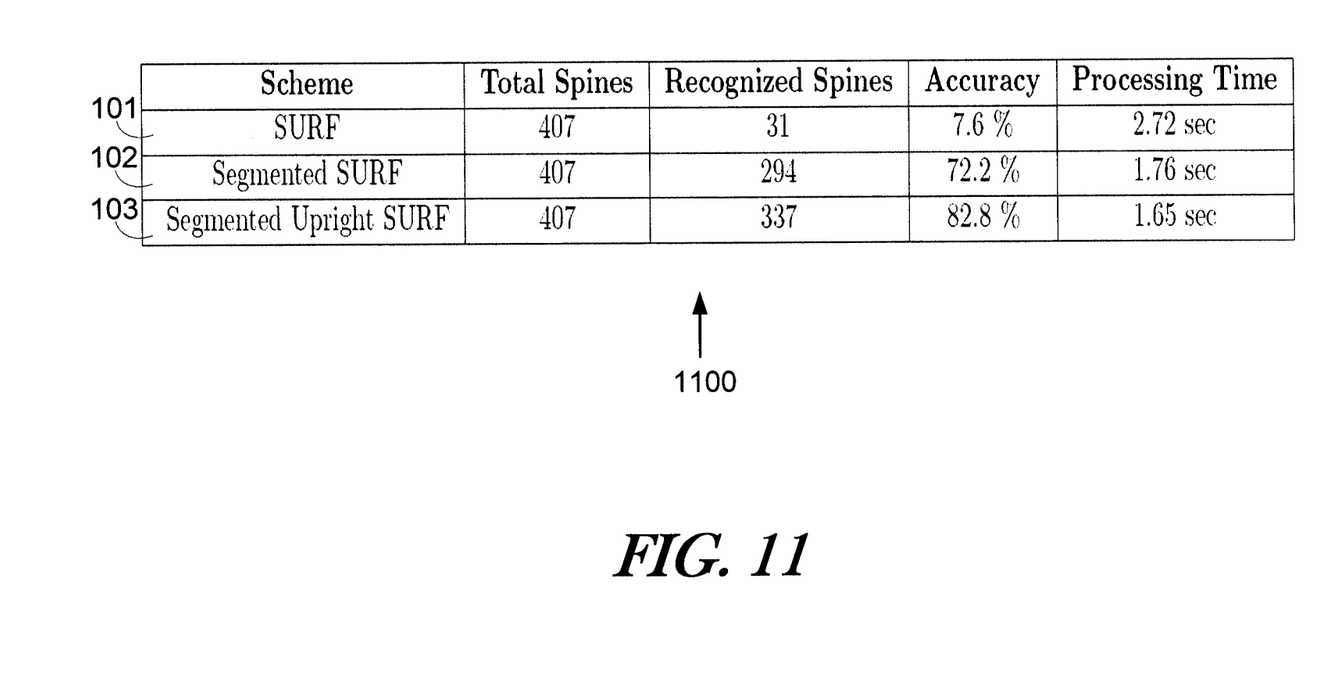
FIG. 11 is a chart comparing performance of different recognition schemes according to various embodiments of the invention.

In contrast, the Segmented SURF scheme segmented out each book spine in the query image before extracting oriented SURF features. Each spine's BoVF was then individually queried against the online database using vocabulary tree scoring followed by geometric verification. Since the amount of clutter was significantly reduced from the perspective of any single spine, this scheme substantially boosted the ratio of inlier to outlier features and therefore greatly improved recognition accuracy. Out of 407 spines in total, Segmented SURF correctly recognized 294 spines, resulting in an accuracy of 72.2 percent (see field 1102), which was higher than the 7.6 percent obtained without segmentation.

Another advantage of the Segmented SURF scheme is that it reduced the processing time to 1.76 sec per query image, compared to the SURF scheme which took 2.72 sec. Timing was measured on a Linux server running at 2.00 GHz. The time savings were due to the extraction of fewer features in total and hence fewer features being subjected to time-consuming geometric verifications. After segmentation, SURF features were detected only in the interior of the segmented spines, not along the spine edges, crevices between books, and in the surrounding bookshelf frame.

Finally, the Segmented Upright SURF scheme also performed spine segmentation prior to feature extraction, but it extracted upright SURF features as opposed to oriented SURF features (see FIG. 7). Since the orientation of the spine was known from segmentation, upright SURF avoided the orientation assignment errors incurred by oriented SURF. FIG. 11 shows in field 1103 that Segmented Upright SURF achieved the best performance of the three schemes: an accuracy of 82.8 percent was attained, representing a 10 percent improvement over Segmented SURF. Because orientation assignment is a costly portion of feature keypoint detection, this scheme also had the fastest processing speed.

Although the principles described herein were set forth in the context of book inventory by way of example, it will be appreciated that these principles and structures may be used to track inventory of other items as well. For example, any item capable of visual identification for which inventory is tracked may be the subject of the described system. Such items include by way of example and not limitation tapes, CDs, DVDs, artwork, museum pieces, rental equipment, vehicles, etc.

Although the described methods, in so far as they relate to machine-implemented steps, may be implemented via hardware or software, in an embodiment of the invention, the non-user implemented steps are implemented on hardware devices, e.g., smartphones, servers, etc., via the execution of software. The term software as used herein refers to computer-executable instructions stored on a non-transient computer-readable medium such as a disc, drive, optical or magnetic storage medium, RAM, ROM, PROM, EPROM, removable or permanent storage, etc. The associated hardware includes a processor for executing the instructions as well as appropriate connections and drivers or modules for carrying out steps such as display, communication, receipt of input, etc.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:
1. A computer-implemented method for image processing and object recognition, the method comprising:
   receiving, by a remote image processing server, an image of a plurality of objects and location information corresponding to the image from a mobile communications device via a wireless network;
   performing, by an image analyzer of the remote image processing server, segmentation to divide the received image into a plurality of regions, wherein performing segmentation comprises:
   generating an edge map from the image;
   removing components of the edge map that are smaller than a predetermined threshold size from the edge map;
   determining a dominant angle for substantially parallel lines of the edge map; and
   identifying the plurality of regions of the image, wherein the plurality of regions of the image correspond to regions of the edge map between lines of the edge map within a predetermined threshold angle of the dominant angle;
   for at least one region of the plurality of regions, extracting, by the remote image processing server, features of the region and matching the features of the region with a database entry to determine an object identity of a single object corresponding to the region;

determining, by the remote image processing server, a localized position of the single object within a room based on the received location information and further based on previously acquired training information;

storing, by the remote image processing server, the localized position of the single object with the corresponding object identity in a database;

receiving, by the remote image processing server, a query for an object: determining: by the remote image processor server, in response to the query, a localized position for the object based on information stored in the database; and outputting, by the remote image processor server, the localized position for the object.

2. The method according to claim 1, wherein the image received from mobile communications device was acquired via a built in camera of the mobile communications device.

3. The method according to claim 1, wherein the location information received from the mobile communications device was determined by the device based on local wireless signals.

4. The method according to claim 3, wherein the location information received from the mobile communications device was further determined based on sensor signals from the one or more accelerometers hosted within the mobile communications device.

5. A non-transitory computer-readable medium, part of a remote image processing server, having processor-executable instructions stored thereon for image processing and object recognition, the processor-executable instructions, when executed by a processor, causing the following steps to be performed:

receiving an image of a plurality of objects and location information corresponding to the image from a mobile communications device via a wireless network;

performing segmentation to divide the received image into a plurality of regions, wherein performing segmentation comprises:

generating an edge map from the image;

removing components of the edge map that are smaller than a predetermined threshold size from the edge map;

determining a dominant angle for substantially parallel lines of the edge map; and identifying the plurality of regions of the image, wherein the plurality of regions of the image correspond to regions of the edge map between lines of the edge map within a predetermined threshold angle of the dominant angle;

for at least one region of the plurality of regions, extracting features of the region and matching the features of the region with a database entry to determine an object identity of a single object corresponding to the region;

determining a localized position of the single object within a room based on the received location information and farther based on previously acquired training information: and storing the localized position of the single object with the corresponding object identity in a database;

receiving a query for an object;

determining, in response to the query, a localized position for the object based o information stored in the database; and outputting the localized position for the object.

6. The non-transitory computer-readable medium according to claim 5, wherein the received image was acquired via a built in camera of the mobile communications device.

7. The non-transitory computer-readable medium according to claim 5, wherein the location information was determined by the mobile communications device based on local wireless signals.

8. The non-transitory computer-readable medium according to claim 7, wherein the location information was further determined based on sensor signals from one or more accelerometers hosted within the mobile communications device.

9. The non-transitory computer-readable medium according to claim 5, wherein the objects are books.

10. The non-transitory computer-readable medium according to claim 9, wherein the received image is an image of the contents of a book shelf.

11. The non-transitory computer-readable medium according to claim 9, wherein the received image is an image of the contents of a single rack of a book shelf having multiple racks.

12. A remote image processing server, the server comprising:

a receiver, configured to receive an image of a plurality of objects and insertion information corresponding to the image from a mobile communications devise via a wireless network;

a processor, configured to:

perform segmentation to divide the received image into a plurality of regions, wherein performing segmentation comprises:

generating an edge map from the image;

removing components of the edge map that are smaller than a predetermined threshold size from the edge map;

determining a dominant angle for substantially parallel lines of the edge map; and identifying the plurality of regions of the image, wherein the plurality of regions of the image correspond to regions of the edge map between lines of the edge map within a predetermined threshold angle of the dominant angle; for at least one region of the plurality of regions extract features of the region and matching the features of the region with a database entry to determine an object identity of a single object corresponding to the region, wherein a Speeded Up Robust Features (SURF) algorithm is used to match the features of the region with the database entry; and determine a localized position of the single object within a room leased on the received location information and farther based on previously acquired training information; and a database, configured to store the localized position of the single object with the corresponding object identity;

wherein the receiver is further configured to receive a query for an object; and wherein the processor is further configured to determine and output the localized position for the object based on information stored in the database.

13. The server of claim 12, wherein the localized position of the single object within the room is received from the mobile communications device.

14. The method according to claim 1, wherein the objects are books.

15. The method according to claim 14, wherein the image received from the mobile communications device is an image of the contents of a book shelf.

16. The method according to claim 14, wherein the image received from the mobile communications device is an image of the contents a single rack of a book shelf having multiple racks.

* * * * *